United States Patent [19]

Puyo et al.

[11] Patent Number: 4,551,921
[45] Date of Patent: Nov. 12, 1985

[54] APPARATUS FOR MEASURING THE GRADIENT OR INCLINATION OF A SURFACE OR OF A LINE

[75] Inventors: Philippe Puyo, Bordeaux; Lucien Bouvet, Pessac, both of France

[73] Assignee: A.B.F. Industrie S.A., Bordeaux, France

[21] Appl. No.: 541,341

[22] PCT Filed: Jan. 26, 1983

[86] PCT No.: PCT/FR83/00020
§ 371 Date: Sep. 27, 1983
§ 102(e) Date: Sep. 27, 1983

[87] PCT Pub. No.: WO83/02662
PCT Pub. Date: Aug. 4, 1983

[30] Foreign Application Priority Data

Jan. 27, 1982 [FR] France ............... 82 01385
Sep. 8, 1982 [FR] France ............... 82 15320

[51] Int. Cl.[4] .............................................. G01C 9/06
[52] U.S. Cl. .............................................. 33/366
[58] Field of Search ............... 33/366, 381, 382, 451, 33/390; 340/689, 27 AT

[56] References Cited

U.S. PATENT DOCUMENTS 1,251,349 12/1917 Day ........................... 33/381 X
1,414,847 5/1922 Wells .
1,663,821 3/1928 Tuomi ........................ 33/381 X
3,826,013 7/1974 Baher ........................ 33/390
4,094,073 6/1978 Parra ........................ 33/366
4,182,046 1/1980 Ludlow et al. .
4,244,117 1/1981 Cantarella ................ 33/366
4,253,242 3/1981 McInerney ................ 33/366
4,437,241 3/1984 Lemelson ................ 33/166

FOREIGN PATENT DOCUMENTS 2929878 2/1981 Fed. Rep. of Germany .
138908 1/1953 Sweden .................... 33/381
158477 2/1921 United Kingdom ........ 33/381

Primary Examiner—Harry N. Haroian
Attorney, Agent, or Firm—Sandler & Greenblum

[57] ABSTRACT

The invention concerns apparatus for measuring the inclination or gradient of a plane or line. The objective of the invention is apparatus for measuring the inclination or gradient of a plane or line with respect to a predetermined reference plane, comprising a generally rectangular or trapezoidal frame equipped with three outer bearing surfaces disposed at right angles one to another along three of the sides of said frame, a device integral with said frame, sensitive to variations in position in space of said apparatus and which can output a signal proportional to the angular deviation between one of said bearing surfaces and said reference plane, and means of displaying the value of the measurement taken by said sensitive device.

18 Claims, 2 Drawing Figures

4,551,921

APPARATUS FOR MEASURING THE GRADIENT OR INCLINATION OF A SURFACE OR OF A LINE

BACKGROUND OF THE INVENTION

1. Field of the Invention

This invention concerns apparatus for measuring and instantaneously displaying the value of the inclination or gradient of any plane or line.

2. Description of the Prior Art

There are currently available two broad types of apparatus or tool for measuring inclination or gradient. One type comprises conventional spirit or water levels, and the variants extrapolated therefrom, and devices utilizing a plumb line associated with more or less sophisticated systems of rules, squares, articulated compasses and protractors. Certain of these tools, such as spirit levels, are not measuring instruments but simply devices for ascertaining whether a plane or line is or is not horizontal. Other types of apparatus included in the above broad type are complicated to use, lacking in precision since they depend on the skill and knowledge of the user and, above all, fragile.

The other broad type is made up of highly technical, complex equipment, utilizing for example gyroscopes or optical systems, laser systems or radio instrumentation. Such apparatus is of course expensive and difficult to use, sometimes even requiring special knowledge.

The objective of the invention is to mitigate these disadvantages by proposing a tool for measuring the degree of inclination or gradient, which is extremely simple to use and which can give instantaneously the value of the angle of inclination or gradient of a plane or a line.

A further objective of the invention is to propose a tool capable of adaptation to diverse uses by offering an extremely extensive range of performance levels and services through its modular structure utilizing electronic technology.

SUMMARY OF THE INVENTION

The invention consists in apparatus for measuring the inclination or gradient of a plane or line with respect to a predetermined reference plane, comprising a generally rectangular or trapezoidal frame equipped with three outer bearing surfaces disposed at right angles one to another along three of the sides of said frame, a device integral with said frame, sensitive to variations in position in space of said apparatus and which can output a signal proportional to the angular deviation between one of said bearing surfaces and said reference plane, and means for displaying the value of the measurement taken by said sensitive device.

In one embodiment of the invention, the apparatus comprises four sides defining a rectangular or a square, three sides supporting said three outer bearing surfaces, the fourth side forming a handle.

Said measuring apparatus advantageously incorporates an analog or digital display device, preferably disposed close to the upper end of said handle, said handle being equipped with a control device such as a trigger or pushbutton initiating the measurement and its immediate display on said display device.

The nature of said sensitive sensitive device for measuring the inclination or gradient may vary in particular according to the use to be made of the apparatus, according to the conditions of employment, the degree of precision sought or the required selling price.

In addition, the electronic subsystem for processing the signals output by said sensitive device may be very easily arranged to enable the introduction of a switching device for altering the units of measurement of the angles of inclination or gradient, any programming device, a visual or audible signaling device, when for example the angle measured reaches a predetermined value. Because of its three reference surfaces, such apparatus may be used to measure the gradient of a floor or a ceiling, as well as the inclination of a wall, the electronic measurement signal processing device also providing for the measurement of such angles with respect to the horizontal and the vertical planes as well as with respect to any plane taken as reference according to the application envisaged.

Other objects and advantages will appear from the following description of an example of the invention, when considered in connection with the accompanying drawing, and the novel features will be particularly pointed out in the appended claims.

DESCRIPTION OF THE PREFERRED EMBODIMENT

Figure 1:
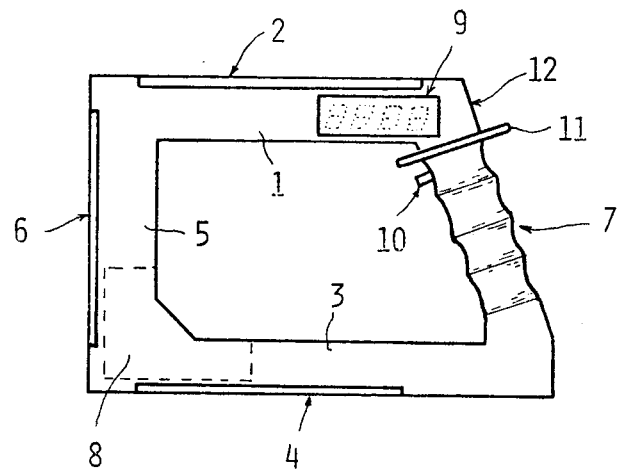
FIG. 1 is a schematic representation of the external morphology of one embodiment of apparatus according to the invention.

Apparatus in accordance with the invention consists of a quadrangular frame comprising two parallel sides one 1 of which defines an upper outer bearing surface 2, the outer side 3 defining a lower outer bearing surface 4.

Said two parallel sides 1 and 3 are connected at one end by a side 5 the outer edge 6 of which defines a surface at right angles to the other two bearing surfaces 2 and 4.

The fourth side constitutes a sculpted handle 7 connecting the other two ends of sides 1, 3.

The complete frame 1-3-5-7 is trapezoidal in shape but could equally be rectangular or square.

On the inside of said sides 3 and 5 for example is mounted a device or sensor 8 to detect and measure the angular deviation between, for example, the plane of lower bearing surface 4 and for example the horizontal plane.

The signal output by this sensor 8 is sent for example to a digital display device 9 attached to the upper side 1, close to handle 7.

Handle 7 is equipped with a trigger or pushbutton 10 initiating the measurement and its immediate display on device 9.

A sort of guard 11 disposed at the upper end of handle 7 ensures that the hand of the user is correctly positioned with the fingers on the handle and its trigger.

Display device 9 could also be disposed at 12 above handle 7 at the end of side 1.

Figure 2:
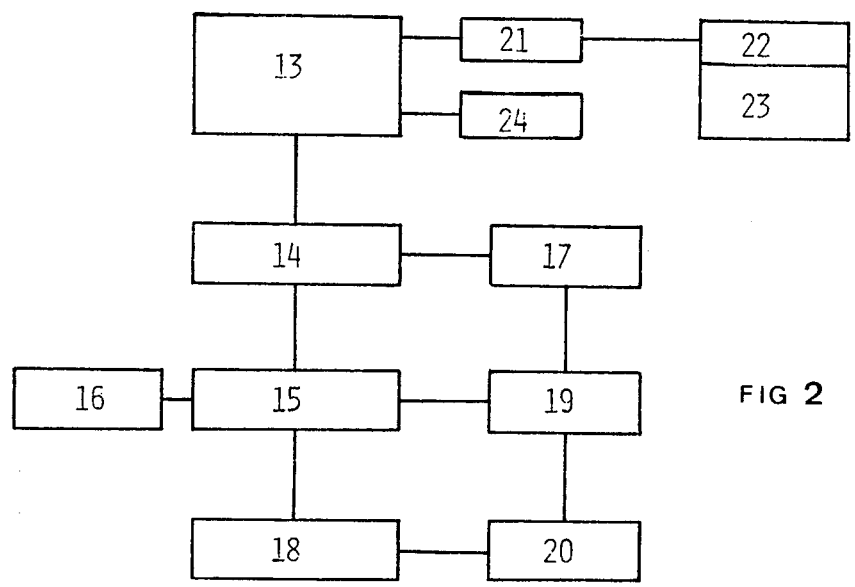
FIG. 2 is an electrical schematic of apparatus according to the invention.

FIG. 2 represents the complete electrical schematic showing the means for measuring, displaying control and checking which may be incorporated in the apparatus according to the invention.

These means comprise a sensor or device 13, of any type, for detecting variations in position in space of the apparatus. The technology of said sensor depends on the use envisaged, the conditions of employment and price, and may be, for example, a spirit bubble, balance, wire, ball or strain gauge device or any other type of detector which can output a signal proportional to the angular deviation between, for example, bearing surfaces 2 and 4 and the horizontal plane, or vertical bearing surface 6 and the vertical plane. This signal may be electrical, optical, light, capacitive, resistive, magnetic or of any other type. In all cases, this signal will be converted into an analog or digital electric signal for subsequent processing or measurement and display purposes.

This signal is measured by a module 14 linked to sensor 13 and to a digital 15 (or analog 16) visual display device.

Said digital display device 15 may be a conventional device incorporating sufficient display capacity to express all the values which the apparatus is capable of measuring according to the precision, scales and services utilized.

The analog display device 16 may be, for example, a physical pointer device or a liquid crystal pointer device.

The display device may also be symbolic, or even animated using all the facilities offered by screens and displays available with state of the art technology.

The measurement means may operate in conjunction with a module 17 for changing the scale or switching the units of measurement of angles and gradients.

An audible indicator 18 may be provided to indicate zero passages, if required with the addition of a programming module 19 which can emit an audible signal when sensor 13 outputs a signal the measurement of which corresponds to a value previously entered using said programming module.

A voice generator 10 may also be equipped to announce in voice form the values measured, in the unit selected, as said measurements vary or according to a pre-entered program.

The various electrical or light circuits are driven by batteries 21, which may be equipped with a remaining life test device.

It is also possible to attach an arithmetic unit 22 with an associated timer 23, providing for the immediate use of values measured by the apparatus, by converting them, estimating their variation in time for example, or retaining their values in volatile or non-volatile memory.

Finally, the trigger or other manually controlled device such as pushbutton, switch or any other device for powering up the circuits and initiating measurement and any control signals and the display, is shown at 24 on FIG. 2.

The various modules and circuits shown in FIG. 2 are of course incorporated in or on the apparatus frame together with any control units therefor.

The apparatus in accordance with the invention can be used to measure any angle of inclination or gradient of a floor, ceiling, wall and, generally, any plane or line with respect to the horizontal, vertical or any other selected reference plane.

This apparatus is particularly easy and fast to use because the measurement and display of the values of angle of inclination or gradient are almost instantaneous, without any adjustment or manipulation on the part of the user, it therefore being possible to use the apparatus directly and immediately without technical knowledge or special training.

The invention is not limited to the embodiments represented and described above but includes all variants notably those concerning the shape of the frame of the apparatus, the nature of the materials used, the technology of the various circuits and means of measurement, control, checking and display. The frame of the apparatus instead of being rectangular or trapezoidal as shown may have a number n of different sides in the form of a polygon with three sides only or with more than four sides (hexagon, octagon), all said sides (except that constituted by the handle) being equipped with an outer reference bearing surface. In particular, a triangular frame two sides of which could form for example an angle of 30° or 45°, would provide apparatus for accessing exiguous places and for measuring on each side of the vertical plane.

It will be understood that various changes in the details, materials and arrangements of parts, which have been herein described and illustrated in order to explain the nature of the invention, may be made by those skilled in the art within the principle and scope of the invention as expressed in the appended claims.

We claim:

1. Apparatus for measuring a gradient with respect to a pre-determined reference plane, said apparatus comprising a frame having at least three outer bearing surfaces disposed at right angles to each other along there sides of said frame, a device integrally connected with said frame and comprising means for sensing and measuring variations in the spatial position of said apparatus and for emitting a signal proportional to the measured angular deviation between one of said bearing surfaces and said reference plane, and means for displaying the value of the measurement taken by said sensing device, said frame being quadrilateral, said three frame sides supporting said three outer bearing surfaces and said frame having a fourth side comprising a handle which is integrally connected to two of said three sides, said sensing and measuring means further comprising a display device disposed adjacent to said handle, said handle further comprising means for activating said measuring and sensing device and displaying said angular deviation on said display device, said measuring and sensing device being positioned within at least one of said three frame sides.

2. An apparatus in accordance with claim 1 wherein said frame is square.

3. An apparatus in accordance with claim 1 wherein said initiation means comprises a trigger.

4. An apparatus in accordance with claim 1 wherein said initiation means comprises a push button.

5. An apparatus in accordance with claim 1 wherein said display device is an analog display device.

6. An apparatus in accordance with claim 1 wherein said display device is a digital display device.

7. An apparatus in accordance with claim 1 wherein said sensing and measuring means comprises a sensor and a measurement module linked to said display device.

8. An apparatus in accordance with claim 7 further comprising a scale linked to said measurement module.

9. An apparatus in accordance with claim 7 further comprising a unit switching device attached to said measurement module.

10. An apparatus in accordance with claim 7 further comprising a programming module.

11. An apparatus in accordance with claim 7 further comprising a circuit for audibly indicating whether a sensed value corresponding to a pre-determined value.

12. An apparatus in accordance with claim 7 further comprising a voice generator for converting said emitted signal into audible voice form.

13. An apparatus in accordance with claim 7 further comprising a computational unit and a timer, said computational unit being linked to said sensing means.

14. An apparatus in accordance with claim 1 wherein the number of frame sides is represented by n and wherein said outer reference bearing surfaces are provided in a number equal to n-1, said handle comprising the remaining side of said frame.

15. An apparatus in accordance with claim 1 wherein said gradient is the gradient of a plane.

16. An apparatus in accordance with claim 1 wherein said gradient is the gradient of a line.

17. An apparatus in accordance with claim 1 wherein said frame is trapezoidal.

18. An apparatus in accordance with claim 1 wherein said frame is rectangular.

* * * * *

UNITED STATES PATENT AND TRADEMARK OFFICE
CERTIFICATE OF CORRECTION

PATENT NO. : 4,551,921

DATED : November 12, 1985

INVENTOR(S) : Philippe PUYO and Lucien BOUVET

It is certified that error appears in the above-identified patent and that said Letters Patent is hereby corrected as shown below:

At column 1, line 57, change "rectangular" to ---rectangle---;

At column 1, line 66, of the printed patent, delete "sensitive" (second occurrence);

At column 2, line 36 of the printed patent, change "outer" to ---other---;  (first occurrence)

At column 2, line 62 of the printed patent, insert ---,--- after "displaying";

At column 3, line 36 of the printed patent, change "10" to ---20---;

At column 4, line 28 of the printed patent, change "there" to ---three---; and

At column 5, line 3 of the printed patent, change "corresponding" to ---corresponds---.

Signed and Sealed this

Eighth Day of April 1986

[SEAL]

Attest:

DONALD J. QUIGG

Attesting Officer

Commissioner of Patents and Trademarks